United States Patent
Miyamoto et al.

(10) Patent No.: US 10,033,676 B2
(45) Date of Patent: Jul. 24, 2018

(54) SYSTEM AND METHOD FOR ANNOTATING A TRANSCRIPT OF AN ONGOING GROUP CHAT SESSION

(71) Applicant: International Business Machines Corporation, Armonk, NY (US)

(72) Inventors: Hiroyuki Miyamoto, Lexington, MA (US); Seol Young Park, Acton, MA (US)

(73) Assignee: International Business Machines Corporation, Armonk, NY (US)

( * ) Notice: Subject to any disclaimer, the term of this patent is extended or adjusted under 35 U.S.C. 154(b) by 395 days.

(21) Appl. No.: 14/068,302

(22) Filed: Oct. 31, 2013

(65) Prior Publication Data

US 2015/0121190 A1    Apr. 30, 2015

(51) Int. Cl.
*G06F 17/00* (2006.01)
*H04L 12/58* (2006.01)
*G06F 17/24* (2006.01)
*H04L 12/18* (2006.01)

(52) U.S. Cl.
CPC ............ *H04L 51/16* (2013.01); *G06F 17/241* (2013.01); *H04L 12/1813* (2013.01); *H04L 51/04* (2013.01); *H04L 12/1831* (2013.01); *H04L 51/046* (2013.01)

(58) Field of Classification Search
CPC ..... G06F 17/241; H04L 51/04; H04L 12/581; H04L 12/1813; H04L 51/046; H04L 51/16; H04L 12/1831
See application file for complete search history.

(56) References Cited

U.S. PATENT DOCUMENTS

| 6,101,532 | A  |   | 8/2000  | Horibe et al. |                      |
|-----------|----|---|---------|---------------|----------------------|
| 6,346,952 | B1 |   | 2/2002  | Shtivelman    |                      |
| 6,823,363 | B1 | * | 11/2004 | Noveck        | H04L 12/1813 709/204 |
| 7,424,670 | B2 | * | 9/2008  | Burke         | G06F 17/241 707/999.102 |
| 7,921,156 | B1 | * | 4/2011  | Stolorz       | G06Q 10/00 709/201   |
| 8,654,951 | B1 | * | 2/2014  | Olmsted       | G06F 17/241 379/202.01 |

(Continued)

OTHER PUBLICATIONS

IBM, "Catch Up Facility for Instant Messaging Conference," IP.Com, IPCOM000133513D, Jan. 27, 2006, pp. 1-5.

*Primary Examiner* — Cesar Paula
*Assistant Examiner* — David Faber
(74) *Attorney, Agent, or Firm* — Brian J. Colandreo, Esq.; Jeffrey T. Placker, Esq.; Holland & Knight LLP (57) ABSTRACT

A method, computer program product, and system is provided for tracking ongoing chat sessions. In an implementation, a method may include receiving, by one or more computing devices, an annotation of an ongoing group chat session. The method may also include associating, by the one or more computing devices, the annotation with the ongoing group chat session. The method may further include displaying, by the one or more computing devices, the annotation in a user interface associated with the ongoing group chat session. The method may also include receiving, by the one or more computing devices, at least one comment associated with the annotation from one or more participants of the ongoing group chat session.

14 Claims, 7 Drawing Sheets

(56) References Cited

U.S. PATENT DOCUMENTS

| | | | | |
|---|---|---|---|---|
| 8,825,778 | B2* | 9/2014 | DeLuca | H04L 51/04 |
| | | | | 709/204 |
| 9,122,751 | B2* | 9/2015 | Chen | G06F 17/30722 |
| 2005/0160145 | A1* | 7/2005 | Gruen | G06Q 10/107 |
| | | | | 709/206 |
| 2006/0031234 | A1* | 2/2006 | Beartusk | G06Q 10/10 |
| 2008/0005130 | A1* | 1/2008 | Logan | G06F 17/30053 |
| 2008/0320086 | A1* | 12/2008 | Callanan | H04L 51/063 |
| | | | | 709/206 |
| 2009/0006477 | A1* | 1/2009 | Oshita | G06F 21/62 |
| 2009/0150397 | A1* | 6/2009 | Chen | G06F 17/30876 |
| 2010/0011282 | A1* | 1/2010 | Dollard | G06F 17/241 |
| | | | | 715/233 |
| 2010/0175003 | A1* | 7/2010 | Castellucci | G06Q 10/107 |
| | | | | 715/758 |
| 2011/0161445 | A1* | 6/2011 | Nelke | H04L 51/04 |
| | | | | 709/206 |
| 2012/0023113 | A1 | 1/2012 | Ferren et al. | |
| 2012/0304075 | A1* | 11/2012 | Dworkin | G06Q 50/26 |
| | | | | 715/753 |
| 2013/0185363 | A1* | 7/2013 | DeLuca | H04L 51/16 |
| | | | | 709/206 |
| 2014/0082106 | A1* | 3/2014 | Scherpa | H04L 12/1831 |
| | | | | 709/206 |
| 2014/0156770 | A1* | 6/2014 | Zheng | H04L 51/36 |
| | | | | 709/206 |
| 2014/0337762 | A1* | 11/2014 | Salerno | G06Q 10/10 |
| | | | | 715/753 |

* cited by examiner

| File  Edit  View  Create  Actions  Tools  Window  Help |

Things to check:

⌐ Check the power, connections, and installation status

⌐ Do you see the problem in one computer or multiple computers?

⌐ What's your operating system?

Have you rebooted the system?
[Yes]

Technician: Hello, what is your operating system?

[enter text]

SYSTEM AND METHOD FOR ANNOTATING A TRANSCRIPT OF AN ONGOING GROUP CHAT SESSION

TECHNICAL FIELD

The present disclosure generally relates to systems and methods for tracking ongoing group chat sessions, and more particularly relates to tracking topics of ongoing group chat sessions.

BACKGROUND

Instant messaging provides a convenient tool for collaboration amongst individuals, for both peer-to-peer and group interactions. For example, instant messaging may provide a communication medium that is akin to an actual real-time conversation. Instant messaging has been used for solving problems and making quick decisions by business users in companies as well as providing a user friendly online experience, such as online shopping and troubleshooting. For example, instant messaging may allow co-workers to efficiently and quickly communicate with one another. Additionally, instant messaging may allow sales associates to provide guidance to consumers for a user friendly online experience. Instant messaging may also be used for technical support.

SUMMARY OF DISCLOSURE

According to an implementation, a method may include receiving, by one or more computing devices, an annotation of an ongoing group chat session. The method may also include associating, by the one or more computing devices, the annotation with the ongoing group chat session. The method may further include displaying, by the one or more computing devices, the annotation in a user interface associated with the ongoing group chat session. The method may also include receiving, by the one or more computing devices, at least one comment associated with the annotation from one or more participants of the ongoing group chat session.

One or more of the following features may be included. The method may also include receiving the annotation based upon, at least in part, a user input. The annotation may also be received based upon, at least in part, a selected portion of a transcript of the ongoing group chat session. The transcript of the ongoing group chat session may include at least one of a real-time transcript of the ongoing group chat session and a stored transcript of the ongoing group chat session.

The method may also include concurrently displaying the at least one comment associated with the annotation in the user interface and a real-time transcript of the ongoing group chat session.

The method may further include associating permissions with the annotation. The permissions associated with the annotation may include at least one of a private permission and a public permission.

The method may include storing the annotation, the at least one comment associated with the annotation, and a transcript of the ongoing group chat session in a data store.

According to another implementation, a computer program product may include a non-transitory computer readable medium having a plurality of instructions stored on it. When executed by a processor, the instructions may cause the processor to perform operations including receiving an annotation of an ongoing group chat session. Instructions may also be included for associating the annotation with the ongoing group chat session. Instructions may also be included for displaying the annotation in a user interface associated with the ongoing group chat session. Instructions may also be included for receiving at least one comment associated with the annotation from one or more participants of the ongoing group chat session.

One or more of the following features may be included. Instructions may also be included for receiving the annotation based upon, at least in part, a user input. The annotation may also be received based upon, at least in part, a selected portion of a transcript of the ongoing group chat session. The transcript of the ongoing group chat session may include at least one of a real-time transcript of the ongoing group chat session and a stored transcript of the ongoing group chat session.

Instructions may be included for concurrently displaying the at least one comment associated with the annotation in the user interface and a real-time transcript of the ongoing group chat session.

Instructions may also be included for associating permissions with the annotation. The permissions associated with the annotation may include at least one of a private permission and a public permission.

Instructions may also be included for storing the annotation, the at least one comment associated with the annotation, and a transcript of the ongoing group chat session in a data store.

According to yet another implementation, a system may include at least one processor device and at least one memory architecture coupled with the at least one processor device. The at least one processor device may be configured for receiving an annotation of an ongoing group chat session. The at least one processor may also be configured for associating the annotation with the ongoing group chat session. The at least one processor may further be configured for displaying the annotation in a user interface associated with the ongoing group chat session. The at least one processor may also be configured for receiving at least one comment associated with the annotation from one or more participants of the ongoing group chat session.

One or more of the following features may be included. The at least one processor may be further configured for receiving the annotation based upon, at least in part, a user input. The annotation may also be received based upon, at least in part, a selected portion of a transcript of the ongoing group chat session. The transcript of the ongoing group chat session may include at least one of a real-time transcript of the ongoing group chat session and a stored transcript of the ongoing group chat session.

The at least one processor may be further configured for concurrently displaying the at least one comment associated with the annotation in the user interface and a real-time transcript of the ongoing group chat session.

The at least one processor may be further configured for associating permissions with the annotation. The permissions associated with the annotation may include at least one of a private permission and a public permission.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
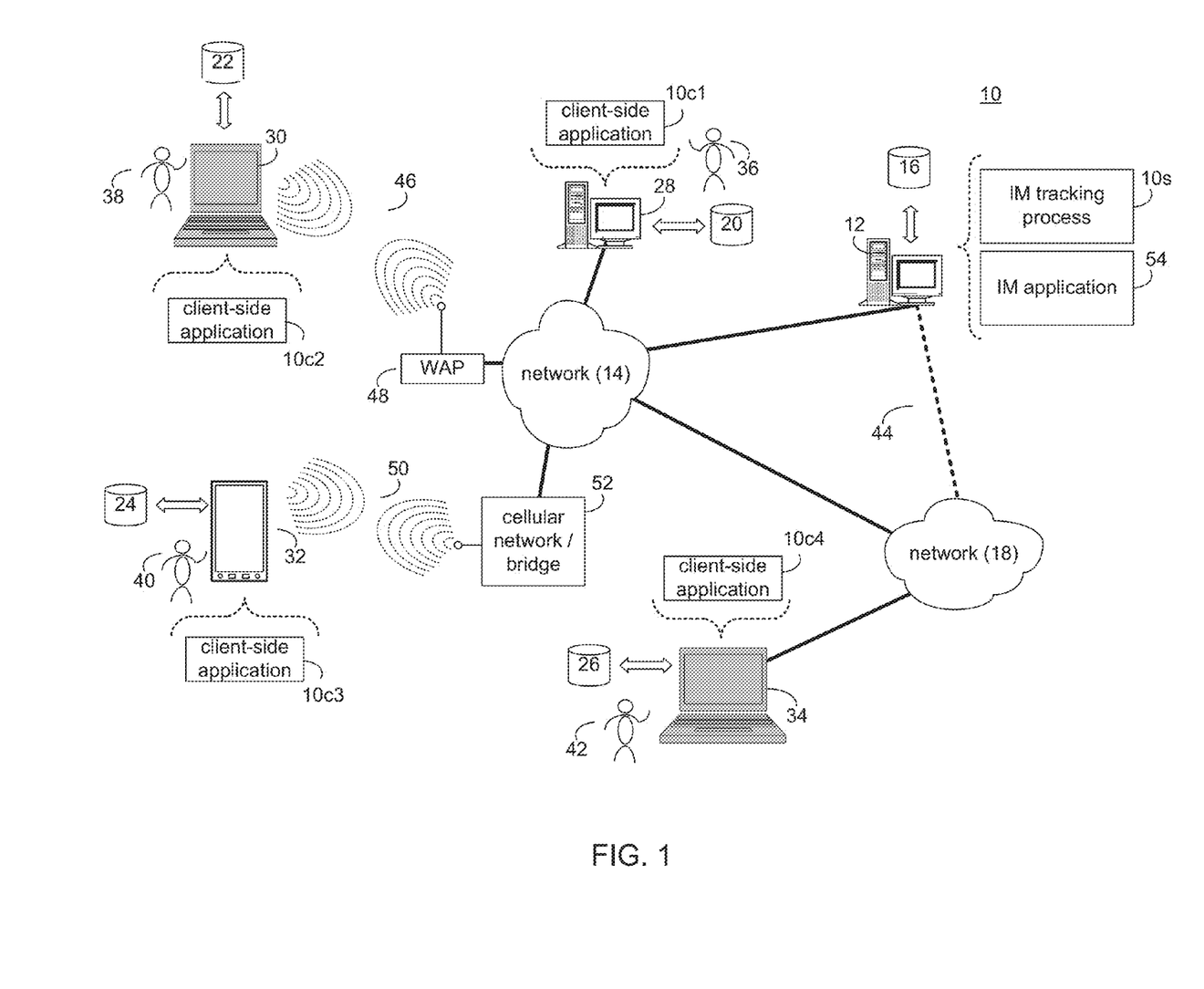
FIG. 1 is a diagrammatic view of a distributed computing network including a computing device that executes an IM tracking process according to an implementation of the present disclosure.

Referring to FIG. 1, there is shown IM tracking process 10. For the following discussion, it is intended to be understood that IM tracking process 10 may be implemented in a variety of ways. For example, IM tracking process 10 may be implemented as a server-side process, a client-side process, or a server-side/client-side process.

For example, IM tracking process 10 may be implemented as a purely server-side process via IM tracking process 10s. Alternatively, IM tracking process 10 may be implemented as a purely client-side process via one or more of client-side application 10c1, client-side application 10c2, client-side application 10c3, and client-side application 10c4. Alternatively still, IM tracking process 10 may be implemented as a server-side/client-side process via server-side IM tracking process 10s in combination with one or more of client-side application 10c1, client-side application 10c2, client-side application 10c3, and client-side application 10c4. In such an example, at least a portion of the functionality of IM tracking process 10 may be performed by IM tracking process 10s and at least a portion of the functionality of IM tracking process 10 may be performed by one or more of client-side application 10c1, 10c2, 10c3, and 10c3.

Accordingly, IM tracking process 10 as used in this disclosure may include any combination of IM tracking process 10s, client-side application 10c1, client-side application 10c2, client-side application 10c3, and client-side application 10c4.

Figure 2:
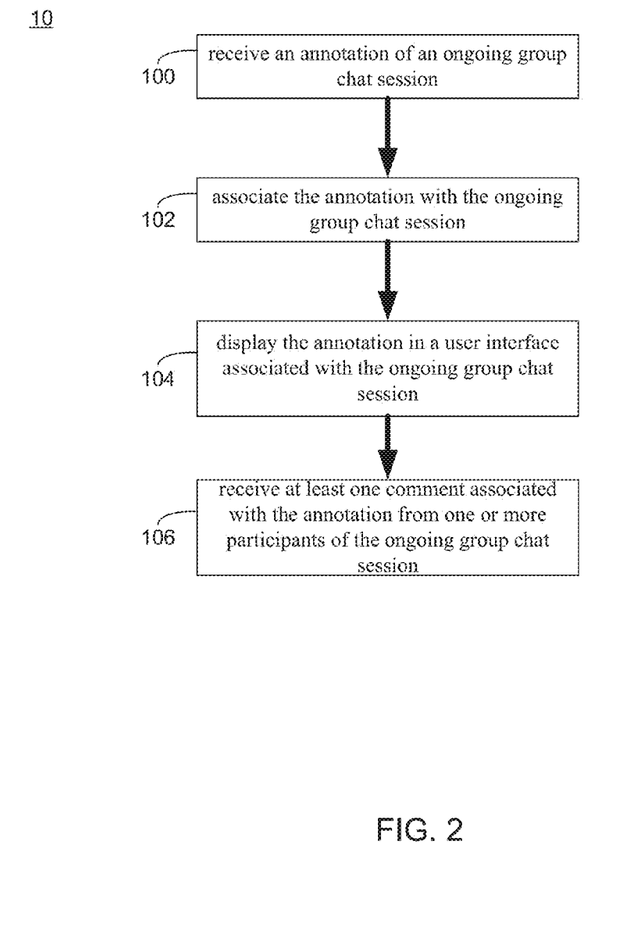
FIG. 2 is a flowchart of the IM tracking process of FIG. 1, according to an implementation of the present disclosure.

Referring also to FIG. 2, and as will be discussed in greater detail below, IM tracking process 10 may receive 100 an annotation of an ongoing group chat session. IM tracking process 10 may also associate 102 the annotation with the ongoing group chat session. IM tracking process 10 may also display 104 the annotation in a user interface associated with the ongoing group chat session. IM tracking process 10 may further receive 106 at least one comment associated with the annotation from one or more participants of the ongoing group chat session.

IM tracking process 10s may be a server application and may reside on and may be executed by computing device 12, which may be connected to network 14 (e.g., the Internet or a local area network). Examples of computing device 12 may include, but are not limited to: a personal computer, a server computer, a series of server computers, a mini computer, a mainframe computer, or a dedicated network device.

The instruction sets and subroutines of IM tracking process 10s, which may be stored on storage device 16 coupled to computing device 12, may be executed by one or more processors (not shown) and one or more memory architectures (not shown) included within computing device 12. Examples of storage device 16 may include but are not limited to: a hard disk drive; a tape drive; an optical drive; a RAID device; an NAS device, a Storage Area Network, a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Examples of client-side applications 10c1, 10c2, 10c3, 10c4 may include but are not limited to, one or more of a voice-over-IP application, a video-over-IP application, a web browser, or a specialized application (e.g., an application running on a mobile platform). The instruction sets and subroutines of client-side application 10c1, 10c2, 10c3, 10c4, which may be stored on storage devices 20, 22, 24, 26 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Examples of storage devices 20, 22, 24, 26 may include but are not limited to: hard disk drives; tape drives; optical drives; RAID devices; random access memories (RAM); read-only memories (ROM), and all forms of flash memory storage devices.

Examples of client electronic devices 28, 30, 32, 34 may include, but are not limited to, personal computer 28, laptop computer 30, mobile computing device 32, notebook computer 34, a netbook computer (not shown), a server computer (not shown), a gaming console (not shown), a data-enabled television console (not shown), and a dedicated network device (not shown). Client electronic devices 28, 30, 32, 34 may each execute an operating system.

Users 36, 38, 40, 42 may access IM tracking process 10 directly through network 14 or through secondary network 18. Further, IM tracking process 10 may be accessed through secondary network 18 via link line 44.

The various client electronic devices (e.g., client electronic devices 28, 30, 32, 34) may be directly or indirectly coupled to network 14 (or network 18). For example, personal computer 28 is shown directly coupled to network 14. Further, laptop computer 30 is shown wirelessly coupled to network 14 via wireless communication channels 46 established between laptop computer 30 and wireless access point (WAP) 48. Similarly, mobile computing device 32 is shown wirelessly coupled to network 14 via wireless communication channel 50 established between mobile computing device 32 and cellular network/bridge 52, which is shown directly coupled to network 14. WAP 48 may be, for example, an IEEE 802.11a, 802.11b, 802.11g, 802.11n, Wi-Fi, and/or Bluetooth device that is capable of establishing wireless communication channel 46 between laptop computer 30 and WAP 48. Additionally, personal computer 34 is shown directly coupled to network 18 via a hardwired network connection.

In some embodiments, IM tracking process 10 may communicate with, interact with, and/or include a component or module of an IM application (e.g., IM application 54). Examples of IM application 54 may include, but are not limited to, IBM Lotus Sametime™, Microsoft Office Live Communications Server™, Jabber XCP™, and AOL Instant Messenger™.

In an embodiment, the instruction sets and subroutines of IM application 54 may be stored, e.g., on storage device 16 associated with server computer 12, which executes IM application 54, and/or another suitable storage device. Further, users (e.g., one or more of users 36, 38, 40, 42) may access IM application 54 in order to participate in an IM session. The users may access IM application 54 via one or more suitable applications, such as client side applications 10c1-10c4 (e.g., an instant messaging application) and/or via a different application (not shown). As generally discussed above, a portion and/or all of the functionality of IM tracking process 10 may be provided by one or more of client side applications 10c1-10c4. For example, in some embodiments IM tracking process 10 (and/or client-side functionality of IM tracking process 10) may be included within and/or interactive with client-side applications 10c1-10c4, which may include client side IM applications. Various additional/alternative configurations may be equally utilized.

As generally discussed above with reference to FIG. 2, IM tracking process 10 may receive 100 an annotation of an ongoing group chat session. IM tracking process 10 may also associate 102 the annotation with the ongoing group chat session. IM tracking process 10 may also display 104 the annotation in a user interface associated with the ongoing group chat session. IM tracking process 10 may further receive 106 at least one comment associated with the annotation from one or more participants of the ongoing group chat session.

For example, server computer 12 (e.g., via IM application 54) may host a plurality of IM sessions between different groups of respective participants. As discussed above, examples of IM sessions hosted by server computer 12 may include, but are not limited to instant messaging sessions, group chat sessions, and the like. IM tracking process 10 may receive 100 an annotation of an ongoing group chat session. For example, a plurality of participants may participate in the ongoing group chat session. Accordingly, IM tracking process 10 may receive 100 an annotation of an ongoing group chat session, e.g., for tracking information in the ongoing group chat session.

Figure 3:
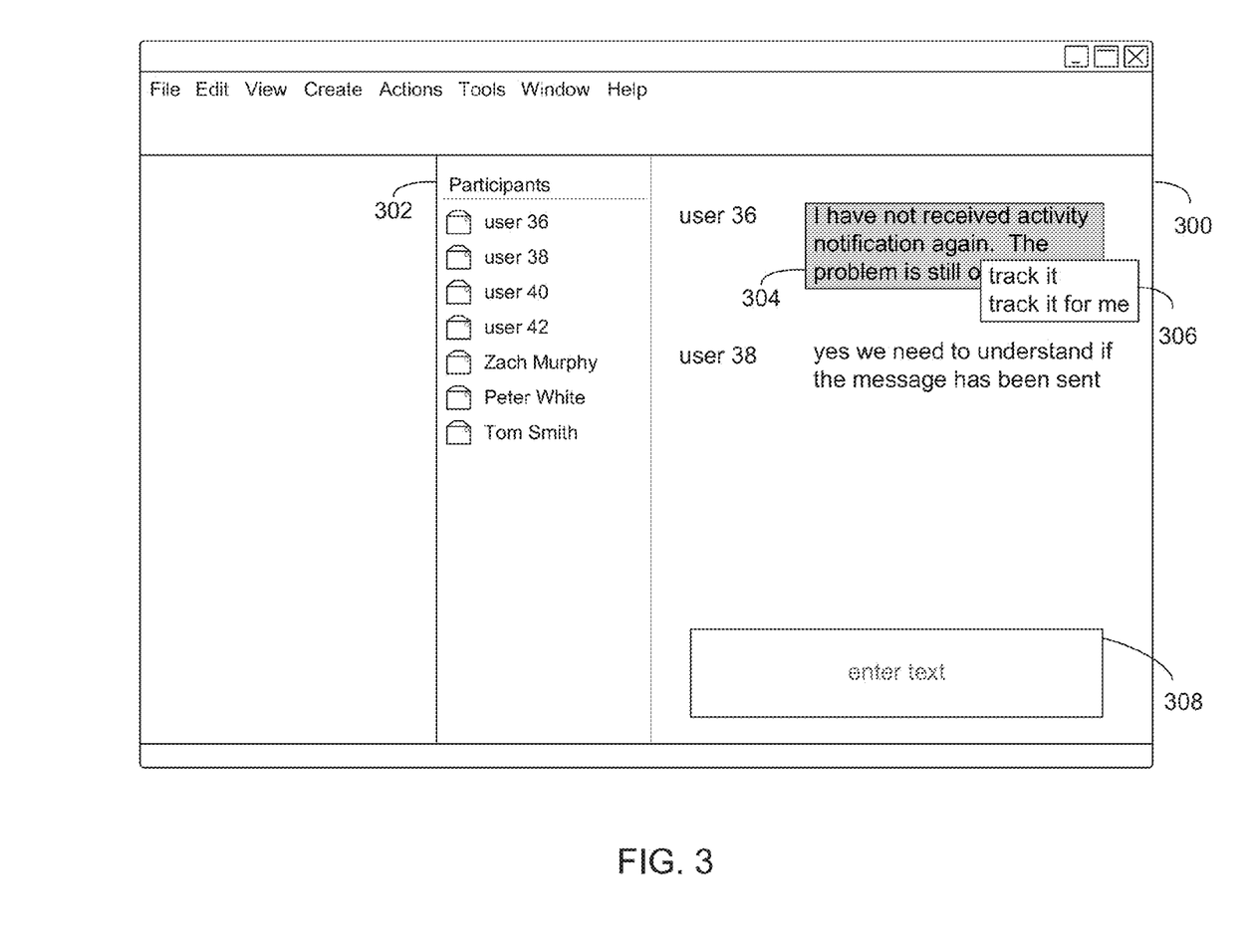
FIG. 3 diagrammatically depicts an implementation of the IM tracking process of FIG. 1, according to an example embodiment.

In an embodiment IM tracking process 10 may receive 100 an annotation of an ongoing group chat session. As used herein, "annotation" may refer to a particular topic or comment of the ongoing group chat session. As shown in FIG. 3, the ongoing group chat session 300 may include a plurality of participants 302 (e.g., user 36, user 38, user 40, user 42, Zach Murphy, Peter White, and Tom Smith). IM tracking process 10 may receive 100 an annotation of the ongoing group chat session 300 from at least one of the plurality of participants 302. For example, IM tracking process 10 may receive 100 the annotation based upon, at least in part, a user input from one of the plurality of participants 302 (e.g., user 36). The ongoing group chat session 300 may rapidly receive many instant messages from the plurality of participants 302 of the ongoing group chat session 300 in a short period of time. User 36 may enter a user input, such as a tracking command, not shown, into instant messaging text entry box 308, along with text of an instant message to post to the ongoing group chat session 300 which user 36 would like to track. For example, user 36 may enter the tracking command "@track" or "@trackforme", not shown, in addition to text of an instant message or topic that user 36 would like to track. User 36 may enter the tracking command "@track" along with text of an instant message or topic that user 36 would like to track into instant messaging text entry box 308 in a similar manner as user 36 may enter text of an instant message as part of the ongoing chat session. Alternatively, user 36 may manually provide a topic of the ongoing group chat session 300 which user 36 would like to track.

In another embodiment, IM tracking process 10 may receive 100 the annotation based upon, at least in part, a selected portion of a transcript of the ongoing group chat session 300. As shown in FIG. 3, the transcript of the ongoing group chat session 300 may be a real-time transcript of the ongoing group chat session 300, however, the transcript may also be a stored transcript of the ongoing group chat session 300. For example, a stored transcript may include a transcript of a portion of the ongoing chat that has already occurred, and which transcript has been stored, e.g., on storage device 16 associated with the computer that may execute IM application 54, or on another storage device. User 36 may, via onscreen pointer, not shown (e.g., which may be controlled by a pointing device, such as a mouse, not shown) select a portion of the real-time transcript of the ongoing group chat session 300 by dragging the onscreen pointer along a selected portion of the real-time transcript, thus highlighting the selected portion of the real-time transcript (e.g., highlighted selected portion 304) user 36 would like to track. User 36 may, e.g., right-click, on the highlighted selected portion 304 resulting in IM process 10 (alone or in conjunction with IM application 54, and/or another process or application) render pop-up menu 306. While pop-up menu 306 is shown to only include two options, i.e., "track it" and "track it for me", this is intended for the purposes of illustration only, and not as a limitation of this disclosure as pop-up menu 306 may include any number or variety of options, the number and nature of which may vary according to user need and design criteria. User 36 may select, e.g., using onscreen pointer, at least one of "track it" or "track it for me" included within pop-up menu 306.

While the previous example has been described as IM tracking process 10 having received 100 the annotation of the ongoing group chat session 300 from only one participant (e.g., user 36), this is intended for purposes of illustration only. IM tracking process 10 may receive 100 an annotation of the ongoing group chat session 300 from any number of participants 302 of the ongoing group chat session 300.

In an embodiment, IM tracking process 10 may associate permissions with the annotation. Permissions associated with the annotation may include a private permission or a public permission. For example, a private permission associated with the annotation may denote that the annotation may be available to be viewed by only the user that selected the annotation of the ongoing group chat session 300. Alternatively, a public permission associated with the annotation may denote that the annotation may be available to be viewed by all participants 302 participating in the ongoing group chat session 300. For example, if user 36 selected "track it for me", user 36 may associate a private permission with the highlighted selected portion 304 such that the annotation is available only to user 36. Alternatively, if user 36 selected "track it", user 36 may intend to associate a public permission with the highlighted selected portion 304 such that the annotation is available to all participants 302 of the ongoing group chat session 300. In yet another embodiment, permissions associated with the annotation may include a custom list, not shown, of users and/or participants 302 of the ongoing group chat session 300 that the annotation may be available to for viewing. Custom list may be generated automatically by IM tracking process 10 or by the user selecting the annotation. For example, if the custom list is auto-generated by IM tracking process 10, custom list may include supervisors and colleagues and/or any known affiliates of user 36 that are either participating or not participating in the ongoing group chat session 300. If the custom list is generated by user 36, user 36 may include any user either participating or not participating in the ongoing group chat session 300. In this manner, users that are not participating in the ongoing group chat session 300 may view the annotation selected by user 36. The permissions associated with the annotation may be updated or changed by user 36 at any point from public to private, or vice versa. Alternatively, the permissions associated with the annotation may be updated or changed by user 36 from a custom list to public or private, or vice versa.

IM tracking process 10 may also associate 102 the annotation with the ongoing group chat session 300, in connection with which the annotation may be received. Once IM tracking process 10 has received 100 the annotation of the ongoing group chat session 300, IM tracking process 10 may associate 102 the annotation with the ongoing group chat session 300. By associating 102 the annotation with the ongoing group chat session 300, IM tracking process more store the annotation and a transcript of the ongoing group chat session 300 in a data store, not shown. Examples of a data store may include, but are not limited to, a list, a database, a directory, and/or any type of collection of data. By associating 102 the annotation with the ongoing group chat session 300, the annotation may be accessed along with the stored transcript of the ongoing group chat session 300 via the data store.

Figure 4:
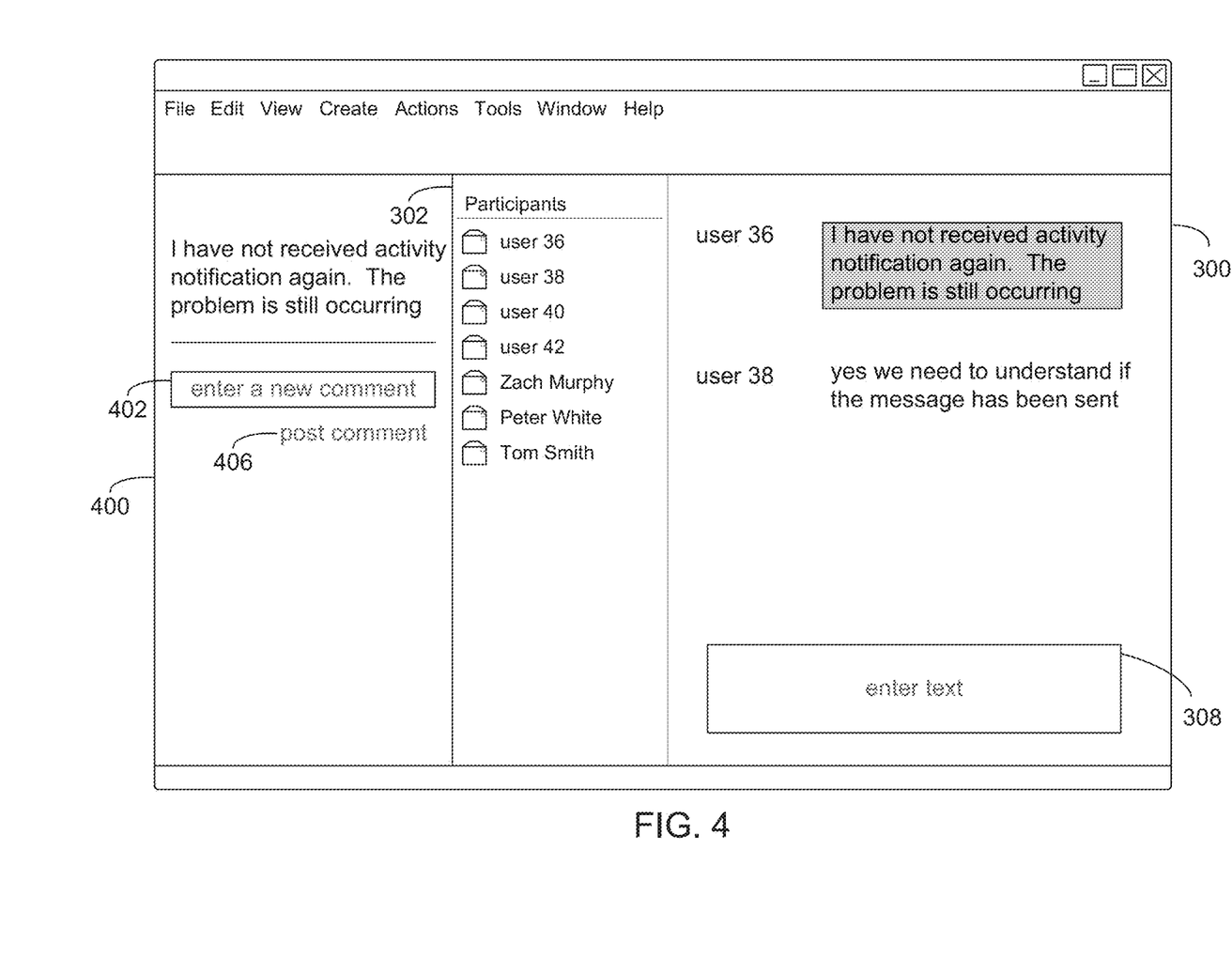
FIG. 4 diagrammatically depicts an implementation of the IM tracking process of FIG. 1, according to an example embodiment.

In an embodiment, IM tracking process 10 may display 104 the annotation in a user interface associated with the ongoing group chat session 300. With reference to FIG. 4, the annotation may be displayed 104 in a tracker area 400 associated with the ongoing group chat session 300. As shown in FIG. 4, tracker area 400 may be included within a single user interface alongside the ongoing group chat session 300. As shown in FIG. 4, tracker area 400 is presented adjacent to the ongoing group chat session 300. This is for illustrative purposes only, as tracker area 400 may be located in any location within the single user interface along with the ongoing group chat session 300. Alternatively in another embodiment, the annotation may be displayed 104 in a separate user interface, not shown, from the ongoing group chat session 300. For example, the ongoing group chat session 300 may be presented in one user interface while the annotation 104 may be displayed 104 in a separate user interface, not shown.

IM tracking process 10 may further receive 106 at least one comment associated with the annotation from one or more participants 302 of the ongoing group chat session 300. As shown in FIG. 4, the annotation displayed 104 in the user interface associated with the ongoing group chat session 300 may include comment field 402. If the permission associated with the annotation is private, IM tracking process 10 may provide comment field 402 to only the user that provided the annotation to IM tracking process 10 (e.g., user 36). Alternatively, if the permission associated with the annotation is public, IM tracking process 10 may provide comment field 402 to all participants 302 of the ongoing group chat session 300. Alternatively still, if the permission associated with the annotation is a custom list, IM tracking process 10 may provide comment field 402 to any user on the custom list. Comment field 402 may be used to provide the latest status, comments, or answers along with the displayed 104 annotation. User 36 or other users and/or participants 302 of the ongoing group chat session 300 may provide updates to the annotated topic. In this manner, user 36 and any other users and/or participants 302 of the group chat session that the annotation is available to may be provided with the latest updates while also participating in the ongoing group chat session 300, where a plurality of chat topics may be ongoing. For example, user 38 may provide at least one comment in comment field 402 and select via onscreen pointer "post comment" 406. IM tracking process 10 may receive 106 the at least one comment and associate the at least one comment with the annotation.

In another embodiment, IM tracking process 10 may concurrently display the at least one comment associated with the annotation in the single user interface and the real-time transcript of the ongoing group chat session 300. As described above, the annotation may be displayed within tracking area 400 associated with the ongoing group chat session 300 within a single user interface. IM tracking process 10 may concurrently display the at least one comment associated with the annotation within the tracking area 400 associated with the ongoing group chat session 300 within the single user interface. As described above, participants 302 of the ongoing group chat session 300 may participate in the ongoing group chat session 300 and view the at least one comment associated with the annotation even while topics change in the ongoing group chat session 300. Alternatively, if the annotation is displayed 104 in a separate user interface from the ongoing group chat session 300, the at least one comment associated with the annotation may be displayed in the separate user interface with the displayed 104 annotation.

IM tracking process 10 may further store the annotation, the at least one comment associated with the annotation, and a transcript of the ongoing group chat session in the data store. Examples of a data store may include, but are not limited to, a list, a database, a directory, and/or any type of collection of data. By storing the annotation and the at least one comment associated with the annotation with the ongoing group chat session 300, the annotation and the associated at least one comment associated with the annotation may be accessed along with the stored transcript of the ongoing group chat session 300 via the data store.

Figure 5:
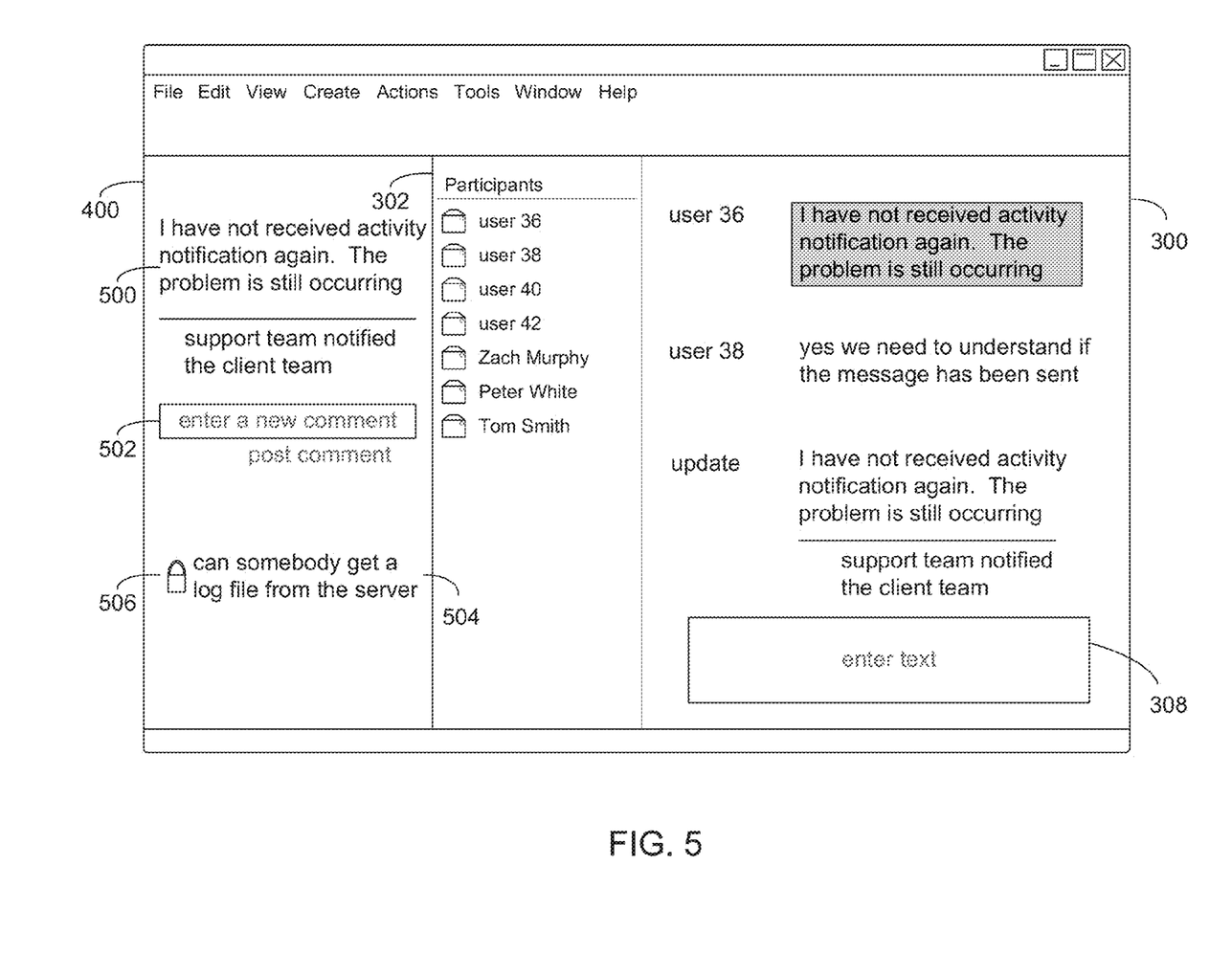
FIG. 5 diagrammatically depicts an implementation of the IM tracking process of FIG. 1, according to an example embodiment.

In yet another embodiment, IM tracking process 10 may automatically post the received 106 at least one comment to the real-time transcript of the ongoing group chat session 300. Referring to FIG. 5, the received 106 comment may be automatically posted to the real-time chat transcript of ongoing group chat session 300 when it was received 106. In this manner, the received 106 comment may be posted to the real-time transcript of the ongoing group session 300 in chronological order of the ongoing group chat session 300. In a further embodiment, IM tracking process 10 may receive a selection of the displayed annotation in the tracking area 400 associated with the ongoing group chat session 300 within the single user interface, not shown. Alternatively, IM tracking process 10 may receive a selection of the displayed annotation from a separate user interface. In response to receiving the selection of the displayed annotation, IM tracking process 10 may automatically highlight any comment associated with the selected annotation posted to the real-time transcript of the ongoing group chat session 300. In this manner, any posted comments associated with the selected annotation to the ongoing group chat session 300 may be made easily visible at a quick glance. In response to receiving the selection of the displayed annotation, IM tracking process 10 may further automatically scroll the real-time transcript of the ongoing group chat session 300 up or down to display the original text in the transcript of the ongoing group chat session 300 surrounding the posted comments.

Referring also to FIG. 5, IM tracking process 10 may receive 100 more than one annotation from the same participant (e.g., user 36) and/or from other participants (e.g., user 38) of ongoing group chat session 300 and may associate the plurality of annotations to the ongoing group chat session 300. As shown in FIG. 5, IM tracking process 10 may display the plurality of annotations in tracking area 400 associated with the ongoing group chat session 300 within the single user interface. Alternatively, IM tracking process 10 may display the plurality of annotations in a separate user interface from the ongoing group chat session 300. Each annotation associated with the ongoing group chat session 300 may have different permissions associated with them. For example, annotation 500 may be a public permission, as IM tracking process 10 provided comment field 502. Further, annotation 504 may be a private annotation, as denoted by "lock" symbol 506 displayed adjacent to annotation 504. Further, annotation 504 may be a private annotation, as IM tracking process 10 has not provided a comment field associated with annotation 504.

Figure 6:
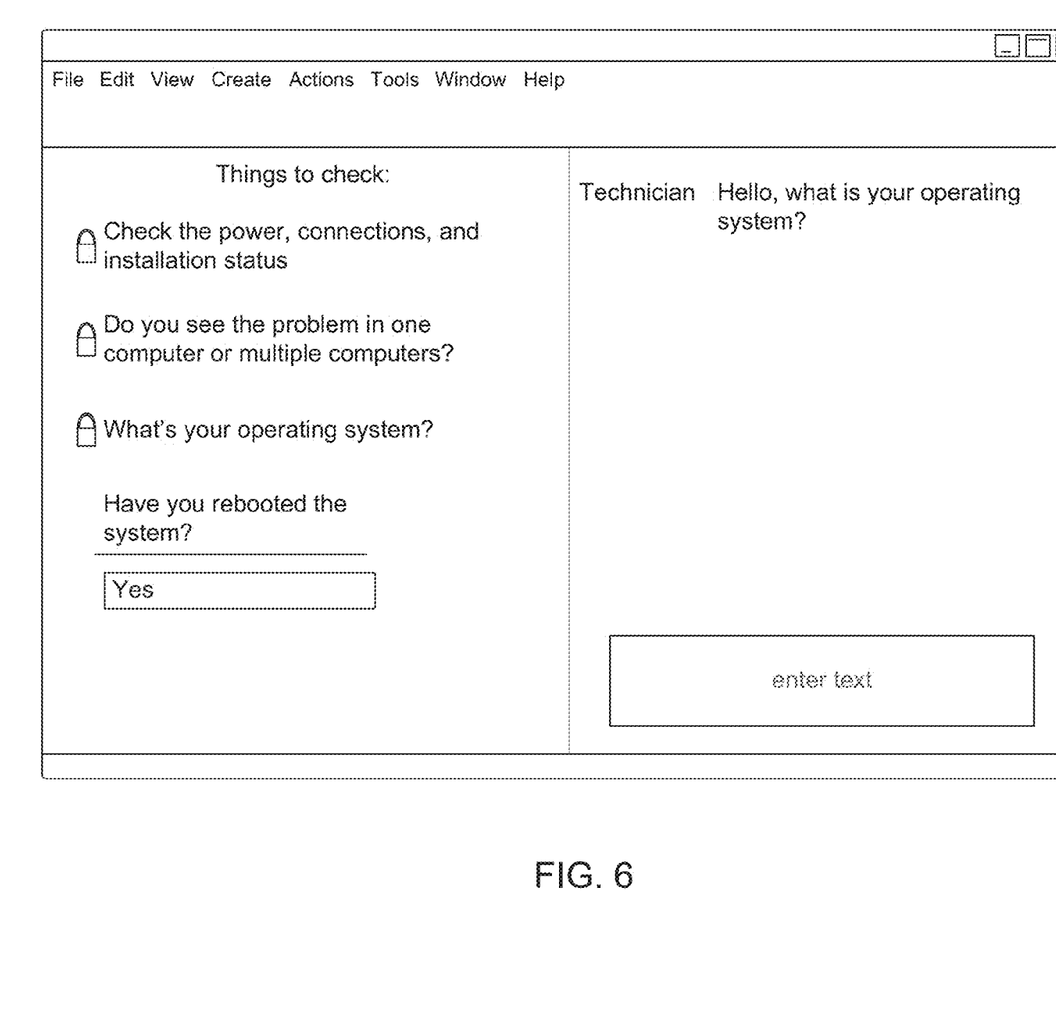
FIG. 6 diagrammatically depicts an implementation of the IM tracking process of FIG. 1, according to an example embodiment.

Other embodiments of the present disclosure may be available. For example, and as shown in FIG. 6, pre-defined, saved annotations with private permissions may be accessed via the data store and displayed in a tracking area associated with instant messaging sessions associated with online retailers and consumers. For example, if a consumer initiates a troubleshooting session, IM tracking process 10 may display the pre-defined annotations, based upon, at least in part, a topic of the troubleshooting session, with private permissions, such that the pre-defined annotations are made available only to the technician and not the consumer. For example, as shown in FIG. 6, annotations with private permissions available to the technician may include "Check the power, connections, and installation status", "Do you see the problem in one computer or multiple computers?", and "What's your operating system?". IM tracking process 10 may provide the annotations in FIG. 6 as a reminder for technician to ask the consumer such troubleshooting questions. These are provided for purposes of illustration only. IM tracking process 10 may provide any number of different annotations.

Figure 7:
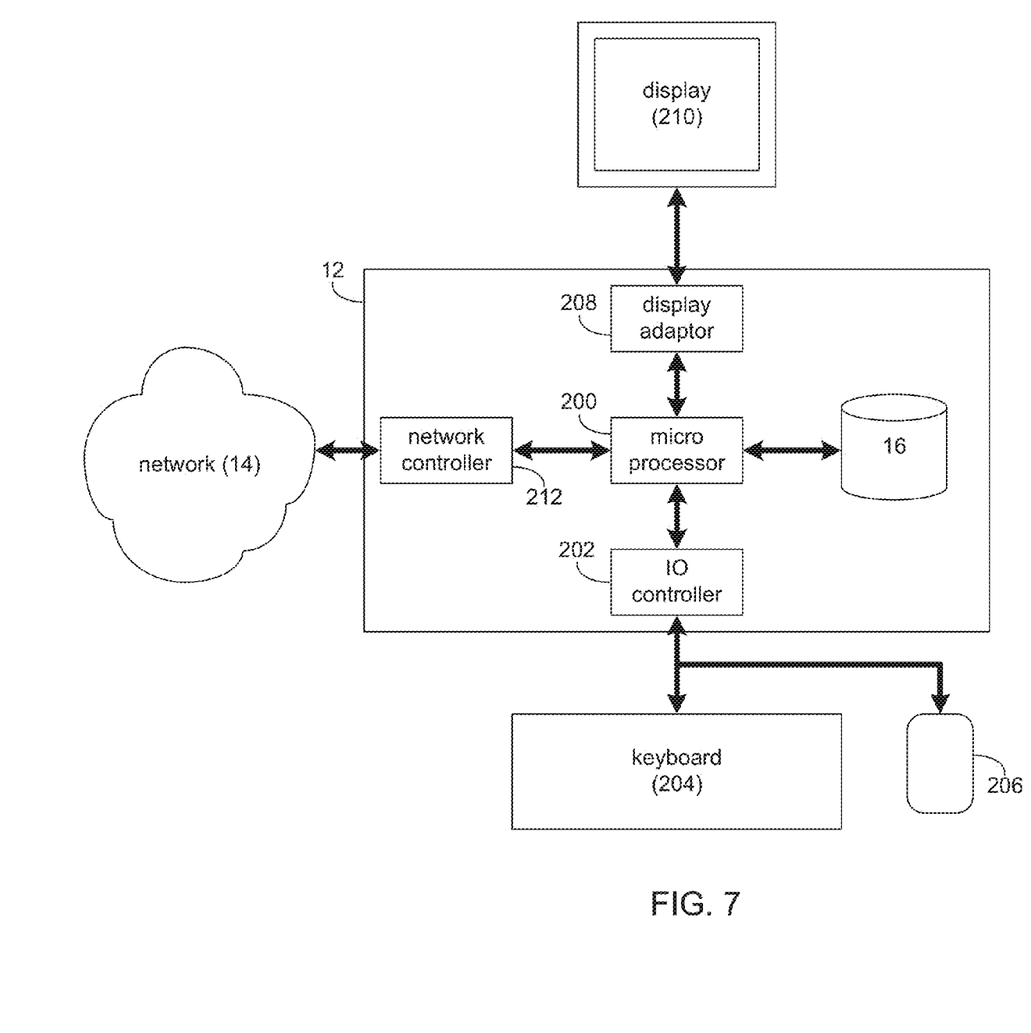
FIG. 7 is a diagrammatic view of the computing device of FIG. 1, according to an implementation of the present disclosure.

Referring also to FIG. 7, there is shown a diagrammatic view of computing system 12. While computing system 12 is shown in this figure, this is for illustrative purposes only and is not intended to be a limitation of this disclosure, as other configurations are possible. For example, any computing device capable of executing, in whole or in part, IM tracking process 10 may be substituted for computing device 12 within FIG. 1, examples of which may include but are not limited to client electronic devices 28, 30, 32, 34.

Computing system 12 may include microprocessor 200 configured to e.g., process data and execute instructions/ code for IM tracking process 10. Microprocessor 200 may be coupled to storage device 16. As discussed above, examples of storage device 16 may include but are not limited to: a hard disk drive; a tape drive; an optical drive; a RAID device; an NAS device, a Storage Area Network, a random access memory (RAM); a read-only memory (ROM); and all forms of flash memory storage devices. IO controller 202 may be configured to couple microprocessor 200 with various devices, such as keyboard 204, mouse 206, USB ports (not shown), and printer ports (not shown). Display adaptor 208 may be configured to couple display 210 (e.g., a CRT or LCD monitor) with microprocessor 200, while network adapter 212 (e.g., an Ethernet adapter) may be configured to couple microprocessor 200 to network 14 (e.g., the Internet or a local area network).

As will be appreciated by one skilled in the art, the present disclosure may be embodied as a method (e.g., executing in whole or in part on computing device 12), a system (e.g., computing device 12), or a computer program product (e.g., encoded within storage device 16). Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium (e.g., storage device 16) having computer-usable program code embodied in the medium.

Any suitable computer usable or computer readable medium (e.g., storage device 16) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, C#.NET, PHP, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor (e.g., processor 200) of a general purpose computer/special purpose computer/other programmable data processing apparatus (e.g., computing device 12), such that the instructions, which execute via the processor (e.g., processor 200) of the computer or other programmable data processing apparatus, create means for implementing the functions/acts specified in the flowchart and/or block diagram block or blocks.

These computer program instructions may also be stored in a computer-readable memory (e.g., storage device 16) that may direct a computer (e.g., computing device 12) or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer (e.g., computing device 12) or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

What is claimed is:

1. A method comprising:
    receiving, by one or more computing devices, an annotation of an ongoing group chat session for an instant messaging application including:
        defining, by the one or more computing devices, a tracking command and an associated text field, wherein the tracking command includes one or more tracking options, wherein the associated text field corresponds to a selected portion of a transcript of the ongoing group chat session to be tracked in response to the tracking command, wherein the transcript of the ongoing group chat session is displayed in a first window of a user interface associated with the ongoing group chat session and the selected portion of the transcript includes text entered into a text entry box of the first window of the user interface associated with the ongoing group chat session as part of the ongoing group chat session, and wherein the annotation is the selected portion of the transcript of the ongoing group chat session to be tracked;
    associating, by the one or more computing devices, the annotation with the ongoing group chat session;
    associating, by the one or more computing devices, permissions with the annotation based upon, at least in part, the one or more tracking options;
    displaying, by the one or more computing devices, the annotation in a second window of the user interface associated with the ongoing group chat session;
    providing, by the one or more computing devices, an annotation comment field to one or more participants of the ongoing group chat session based upon, at least in part, the permissions associated with the annotation;
    receiving, by the one or more computing devices, at least one comment associated with the annotation from the annotation comment field provided to the one or more participants of the ongoing group chat session, wherein the annotation comment field of the second window of the user interface associated with the ongoing group chat session is separate from the text entry box of the first window of the user interface associated with the ongoing group chat session simultaneously displayed in the instant messaging application; and
    concurrently displaying, by the one or more computing devices, the at least one comment associated with the annotation in the transcript of the ongoing group chat session in the first window of the user interface associated with the ongoing group chat session and in the second window of the user interface associated with the ongoing group chat session.

2. The method of claim 1, wherein receiving the annotation of the ongoing group chat session includes one or more of:
receiving the annotation based upon, at least in part, a user input; and
receiving the annotation based upon, at least in part, the selected portion of the transcript of the ongoing group chat session.

3. The method of claim 2, wherein the transcript of the ongoing group chat session includes at least one of a real-time transcript of the ongoing group chat session and a stored transcript of the ongoing group chat session.

4. The method of claim 1, wherein the permissions associated with the annotation include at least one of a private permission and a public permission.

5. The method of claim 1, further comprising:
storing the annotation, the at least one comment associated with the annotation, and the transcript of the ongoing group chat session in a data store.

6. A computer program product comprising a non-transitory computer readable medium having a plurality of instructions stored thereon, which, when executed by a processor, cause the processor to perform operations including:
receiving an annotation of an ongoing group chat session for an instant messaging application including:
defining a tracking command and an associated text field, wherein the tracking command includes one or more tracking options, wherein the associated text field corresponds to a selected portion of a transcript of the ongoing group chat session to be tracked in response to the tracking command, wherein the transcript of the ongoing group chat session is displayed in a first window of a user interface associated with the ongoing group chat session and the selected portion of the transcript includes text entered into a text entry box of the first window of the user interface associated with the ongoing group chat session as part of the ongoing group chat session, and wherein the annotation is the selected portion of the transcript of the ongoing group chat session to be tracked;
associating the annotation with the ongoing group chat session;
associating permissions with the annotation based upon the one or more tracking options;
displaying the annotation in a second window of the user interface associated with the ongoing group chat session;
providing an annotation comment field to one or more participants of the ongoing group chat session based upon, at least in part, the permissions associated with the annotation;
receiving at least one comment associated with the annotation from the annotation comment field provided to the one or more participants of the ongoing group chat session, wherein the annotation comment field of the second window of the user interface associated with the ongoing group chat session is separate from the text entry box of the first window of the user interface associated with the ongoing group chat session simultaneously displayed in the instant messaging application; and
concurrently displaying the at least one comment associated with the annotation in the transcript of the ongoing group chat session in the first window of the user interface associated with the ongoing group chat session and in the second window of the user interface associated with the ongoing group chat session.

7. The computer program product of claim 6, wherein receiving the annotation of the ongoing group chat session includes one or more of:
receiving the annotation based upon, at least in part, a user input; and
receiving the annotation based upon, at least in part, the selected portion of the transcript of the ongoing group chat session.

8. The computer program product of claim 7, wherein the transcript of the ongoing group chat session includes at least one of a real-time transcript of the ongoing group chat session and a stored transcript of the ongoing group chat session.

9. The computer program product of claim 6, wherein the permissions associated with the annotation include at least one of a private permission and a public permission.

10. The computer program product of claim 6, further comprising:
storing the annotation, the at least one comment associated with the annotation, and the transcript of the ongoing group chat session in a data store.

11. A system comprising:
at least one processor device and at least one memory architecture coupled with the at least one processor device, the at least one processor device configured for:
receiving an annotation of an ongoing group chat session for an instant messaging application including:
defining a tracking command and an associated text field, wherein the tracking command includes one or more tracking options, wherein the associated text field corresponds to a selected portion of a transcript of the ongoing group chat session to be tracked in response to the tracking command, wherein the transcript of the ongoing group chat session is displayed in a first window of a user interface associated with the ongoing group chat session and the selected portion of the transcript includes text entered into a text entry box of the first window of the user interface associated with the ongoing group chat session as part of the ongoing group chat session, and wherein the annotation is the selected portion of the transcript of the ongoing group chat session to be tracked;
associating the annotation with the ongoing group chat session;
associating permissions with the annotation based upon the one or more tracking options;
displaying the annotation in a second window of the user interface associated with the ongoing group chat session;
providing an annotation comment field to one or more participants of the ongoing group chat session based upon, at least in part, the permissions associated with the annotation;
receiving at least one comment associated with the annotation from the annotation comment field provided to the one or more participants of the ongoing group chat session, wherein the annotation comment field of the second window of the user interface associated with the ongoing group chat session is separate from the text entry box of the first window of the user interface associated with the ongoing group chat session simultaneously displayed in the instant messaging application; and concurrently displaying the at least one comment associated with the annotation in the transcript of the ongoing group chat session in the first window of the user interface associated with the ongoing group chat session and in the second window of the user interface associated with the ongoing group chat session.

12. The system of claim 11, wherein receiving the annotation of the ongoing group chat session includes one or more of:

receiving the annotation based upon, at least in part, a user input; and receiving the annotation based upon, at least in part, the selected portion of the transcript of the ongoing group chat session.

13. The system of claim 12, wherein the transcript of the ongoing group chat session includes at least one of a real-time transcript of the ongoing group chat session and a stored transcript of the ongoing group chat session.

14. The system of claim 11, wherein the permissions associated with the annotation include at least one of a private permission and a public permission.

* * * * *